US010753759B2

(12) United States Patent
Kwon et al.

(10) Patent No.: US 10,753,759 B2
(45) Date of Patent: Aug. 25, 2020

(54) VECTOR MAP DISPLAY SYSTEM AND METHOD BASED ON MAP SCALE CHANGE

(71) Applicant: HYUNDAI MNSOFT, INC., Seoul (KR)

(72) Inventors: Jin Young Kwon, Seoul (KR); Hyun Do Jung, Seoul (KR); Hong Seok Kim, Seoul (KR); Sun Mi Seo, Seoul (KR); Yeon Hee Park, Seoul (KR)

(73) Assignee: Hyundai Mnsoft, Inc., Seoul (KR)

( * ) Notice: Subject to any disclaimer, the term of this patent is extended or adjusted under 35 U.S.C. 154(b) by 341 days.

(21) Appl. No.: 15/858,924

(22) Filed: Dec. 29, 2017

(65) Prior Publication Data

US 2018/0143030 A1    May 24, 2018

Related U.S. Application Data

(63) Continuation-in-part of application No. PCT/KR2015/011944, filed on Nov. 6, 2015.

(30) Foreign Application Priority Data

Jun. 30, 2015 (KR) .......................... 10-2015-0092898

(51) Int. Cl.
*G01C 21/36* (2006.01)
*G08G 1/137* (2006.01)
*G08G 1/0962* (2006.01)

(52) U.S. Cl.
CPC ....... *G01C 21/3614* (2013.01); *G01C 21/367* (2013.01); *G01C 21/3638* (2013.01); *G08G 1/137* (2013.01); *G08G 1/0962* (2013.01)

(58) Field of Classification Search
CPC ............ G01C 21/3614; G01C 21/3638; G01C 21/367; G08G 1/137; G08G 1/0962
See application file for complete search history.

(56) References Cited

U.S. PATENT DOCUMENTS

| 5,913,918 A * | 6/1999 | Nakano ................. G01C 21/36 |
| | | 701/454 |
| 6,169,552 B1 * | 1/2001 | Endo ...................... G01C 21/32 |
| | | 345/427 |

(Continued)

FOREIGN PATENT DOCUMENTS

| JP | 2002-071357 A | 3/2002 |
| JP | 4608309 B2 | 7/2006 |

(Continued)

*Primary Examiner* — Thomas Ingram
(74) *Attorney, Agent, or Firm* — Morgan, Lewis & Bockius LLP

(57) ABSTRACT

A vector map display method executed by a user terminal device may include: a web vector map display viewpoint change step of changing a viewpoint of a web vector map according to the directions of previously stored first and second viewpoints; a background or POI information extraction step of extracting a background or one or more pieces of POI information corresponding to a current position of the user terminal device from data of the web vector map by reflecting the first and second viewpoints; a size ratio adjusting step of adjusting the size ratio of the extracted background or POI information; a current web vector map data generation step of generating data of the current web vector map corresponding to the current position; and a current web vector map display step of displaying the data of the current web vector map.

20 Claims, 11 Drawing Sheets

(56) References Cited

U.S. PATENT DOCUMENTS

2009/0273601 A1* 11/2009 Kim .................. G06T 17/05
                                                                         345/419
2018/0143030 A1* 5/2018 Kwon .............. G01C 21/3614
2018/0301111 A1* 10/2018 Park ................ G09B 29/00

FOREIGN PATENT DOCUMENTS

| KR | 10-2011-0097080 A | 8/2011 |
| KR | 10-2009-0114860 A | 11/2011 |
| KR | 10-2012-0056127 A | 6/2012 |
| KR | 10-2015-0051256 A | 5/2015 |

* cited by examiner

VECTOR MAP DISPLAY SYSTEM AND METHOD BASED ON MAP SCALE CHANGE

CROSS-REFERENCE TO RELATED APPLICATIONS

The present application is a continuation-in-part of currently pending International Patent Application No. PCT/KR2015/011944, filed Nov. 6, 2015, which claims priority to Korean Patent Application No. 10-2015-0092898, filed Jun. 30, 2015, the entire contents of which is incorporated herein for all purposes by this reference.

TECHNICAL FIELD

The present invention relates to a vector map display method based on a map scale change, and more particularly, to a vector map display method based on a map scale change

BACKGROUND ART

Recently, a route guidance service has been popularized, which searches for the optimal route or the shortest route to a destination from the current position when a driver inputs the destination through a vehicle navigation system such as a navigation terminal device, and provides the driver with route information in the form of a text, voice and image. The route guidance service is provided through various sensors such as a wheel sensor, vehicle speed sensor and gyro sensor, which are installed in the vehicle navigation system. The route guidance service is provided as follows. When the driver transmits the current position and the destination information to a road information provider using the vehicle navigation system, the road information provider calculates the optimal or shortest route data to the destination from the current position of the driver by referring to geographic information and real-time traffic information, and transmits the calculated route data to the vehicle navigation system.

In the conventional route guidance service, map information is displayed based on one viewpoint. In this case, since roads, buildings and POI (Point of Interest)s displayed in the left and right sides are displayed based on one viewpoint, the conventional route guide service has difficulties in satisfying the needs of a general driver who needs roads, buildings and POIs located in the right side rather than roads, buildings and POIs located in the left side, based on the driving direction of the driver's vehicle.

In order to remove the difficulties, various display methods such as a bird's eye view have been applied. However, the route guidance service is still displayed based on one viewpoint.

The related art of the present invention is disclosed in Korean Patent Publication No. 10-2012-0056127.

DISCLOSURE

Technical Problem

Embodiments of the present invention are directed to a vector map display system and method based on a map scale change, which are capable of setting two viewpoints composed of a bird eye's view facing downward from above and a viewpoint from a side, and displaying the two viewpoints through a map.

Also, embodiments of the present invention are directed to a vector map display system and method based on a map scale change, which are capable of providing a route guidance service using a vector map which has no limitation in displaying a map, extracting and calculating a background or one or more pieces of POI information of the map, adjusting the size ratio of the background or one or more pieces of POI information according to the extracted information by reflecting the two viewpoints, and displaying the ratio-adjusted background or one or more pieces of POI information.

Technical Solution

In an embodiment, a web vector map display method executed by a user terminal device may include: a web vector map display viewpoint change step of changing a viewpoint of a web vector map according to the directions of previously stored first and second viewpoints; a background or POI information extraction step of extracting a background or one or more pieces of POI information corresponding to a current position of the user terminal device from data of the web vector map by reflecting the first and second viewpoints; a size ratio adjusting step of adjusting the size ratio of the extracted background or POI information based on the first and second viewpoints; a current web vector map data generation step of generating data of the current web vector map corresponding to the current position by reflecting the ratio-adjusted background or POI information into the data of the web vector map; and a current web vector map display step of displaying the data of the current web vector map.

The current web vector map display step may include displaying the data of the current web vector map through a web page on the web to which the user terminal device is connected.

The first viewpoint may be a viewpoint facing the front based on the driving direction of a vehicle in which the user terminal device is located, and include a viewpoint facing downward from above at a predetermined angle based on the driving direction of the vehicle.

The second viewpoint may be a viewpoint from the right or left side based on the driving direction of a vehicle in which the user terminal device is located, and include a viewpoint separated at an angle of 180 degrees or less based on the driving direction of the vehicle and facing downward from above at a predetermined angle.

The background or POI information extraction step may include: extracting a background or one or more pieces of POI information, which is to be currently displayed, from the data of the web vector map depending on a front or rear distance of the vehicle in which the user terminal is located, based on the first viewpoint; and calculating the size of the extracted background or one or more pieces of POI information which is to be currently displayed.

The size ratio adjusting step may include adjusting the size ratio of POI information displayed in a display region based on the second viewpoint to a larger size ratio than the size ratio of POI information displayed in the other regions.

The size ratio adjusting step may include readjusting the size ratio of the extracted background or POI information according to a user's touch input signal received by the user terminal device.

In another embodiment, there is provided a web vector map display system including a user terminal device. The user terminal device may include: a storage configured to store data of a web vector map received from a server, first viewpoint information indicating the direction of a first viewpoint, and second viewpoint information indicating the direction of a second viewpoint in advance; a display configured to display the web vector map; and a controller configured to change a viewpoint of the web vector map according to the directions of the first and second viewpoints stored in the storage, extract a background or one or more pieces of POI information corresponding to a current position from data of the web vector map by reflecting the first and second viewpoints, adjust the size ratio of the extracted background or POI information based on the first and second viewpoints, generate data of the current web vector map corresponding to the current position by reflecting the ratio-adjusted background or POI information into the data of the web vector map, and control the display to display the generated data.

The data of the current web vector map may be displayed through a web page on the web to which the user terminal device is connected.

The first viewpoint may be a viewpoint facing the front based on the driving direction of a vehicle in which the user terminal device is located, and include a viewpoint facing downward from above at a predetermined angle based on the driving direction of the vehicle.

The second viewpoint may be a viewpoint from the right or left side based on the driving direction of a vehicle in which the user terminal device is located, and include a viewpoint separated at an angle of 180 degrees or less based on the driving direction of the vehicle and facing downward from above at a predetermined angle.

The controller may extract a background or one or more pieces of POI information, which is to be currently displayed, from the data of the web vector map depending on a front or rear distance of the vehicle in which the user terminal device is located, based on the first viewpoint, and calculate the size of the extracted background or one or more pieces of POI information which is to be currently displayed.

The controller may adjust the size ratio of POI information displayed in a display region based on the second viewpoint to a larger size ratio than the size ratio of POI information displayed in the other regions.

The controller may readjust the size ratio of the extracted background or POI information according to a user's touch input signal received through the display.

In another embodiment, a vector map display method executed by a user terminal device may include: a vector map display viewpoint change step of changing a viewpoint of a vector map according to the directions of previously stored first and second viewpoints; a background or POI (Point of Interest) information extraction step of extracting a background or one or more pieces of POI information corresponding to a current position of the user terminal device from data of the vector map by reflecting the first and second viewpoints; a size ratio adjusting step of adjusting the size ratio of the extracted background or POI information based on the first and second viewpoints; a current vector map data generation step of generating data of the current vector map corresponding to the current position by reflecting the ratio-adjusted background or POI information into the data of the vector map; and a current vector map display step of displaying the data of the current vector map.

The first viewpoint may be a viewpoint facing the front based on the driving direction of a vehicle in which the user terminal device is located, and include a viewpoint facing downward from above at a predetermined angle based on the driving direction of the vehicle.

The second viewpoint may be a viewpoint from the right or left side based on the driving direction of a vehicle in which the user terminal device is located, and include a viewpoint separated at an angle of 180 degrees or less based on the driving direction of the vehicle and facing downward from above at a predetermined angle.

The background or POI information extraction step may include: extracting a background or one or more pieces of POI information, which is to be currently displayed, from the data of the vector map depending on a front or rear distance of the vehicle in which the user terminal is located, based on the first viewpoint; and calculating the size of the extracted background or one or more pieces of POI information which is to be currently displayed.

The size ratio adjusting step may include adjusting the size ratio of POI information displayed in a display region based on the second viewpoint to a larger size ratio than the size ratio of POI information displayed in the other regions.

The size ratio adjusting step may include readjusting the size ratio of the extracted background or POI information according to a user's touch input signal received by the user terminal device.

Advantageous Effects

According to the embodiments of the invention, the vector map display system and method based on a map scale change can change the viewpoint of the map according to two or more viewpoints set therein. Thus, the map display can exhibits the stereoscopic effects for roads, buildings and POIs in response to an environment and viewpoint of a user.

Furthermore, the vector map display system and method based on a map scale change can extract POI information required for driving route guidance by utilizing vector map information, thereby securing the visibility of the map displayed during the route guidance service.

BEST MODE

Figure 1:
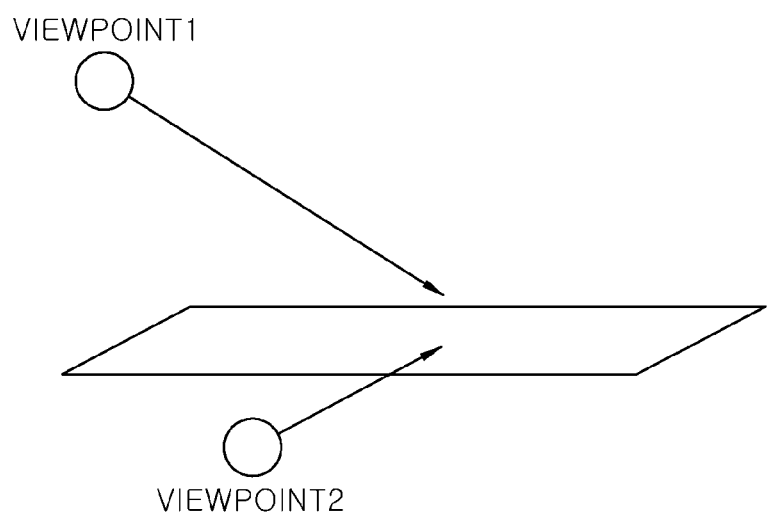
FIG. 1 illustrates two viewpoints for displaying a vector map in accordance with an embodiment of the present invention.

Hereafter, exemplary embodiments of the present invention will be described in detail with reference to the accompanying drawings. However, the present invention is not limited to the exemplary embodiments. Like reference numerals in the respective drawings represent components to perform substantially the same functions.

Terms including ordinal numbers such as first and second may be used for describing various components, but the components are not limited by the terms. The terms are used only to distinguish one component from another component. For example, a first component may be referred to as a second component within the scope of the present invention, and the second component may be referred to as the first component. The terms used in this specification are used only to describe a specific embodiment, and do not limit the present invention. The terms of a singular form may include plural forms unless referred to the contrary.

In this specification, general terms which are widely used nowadays are selected as the terms used herein in consideration of functions in the present invention. However, the terms may be changed depending on an appearance of a precedent or new technique or the intention of a person skilled in the art. In a specific case, a term selected by the present applicant may be used. In this case, the meaning of the term will be described in detail in the corresponding part of this specification. Therefore, the definition of the terms used herein should not be made by the names of the terms, but made by the meanings of the terms based on the overall disclosures set forth herein.

Throughout the specification, when an element "includes" a component, it may indicate that the element does not exclude another component unless referred to the contrary, but can further include another component.

In the following embodiments of the present invention, a user terminal device may indicate an arbitrary electronic device having a display such as a touch screen, and may be referred to as a portable terminal, mobile terminal, communication terminal or portable mobile terminal. For example, the electronic device may include a smart phone, a mobile phone, a navigation system, a head unit for vehicles, a tablet computer, a flexible device, a flexible display device and the like.

Two Viewpoints for Vector Map Display

Figure 2:
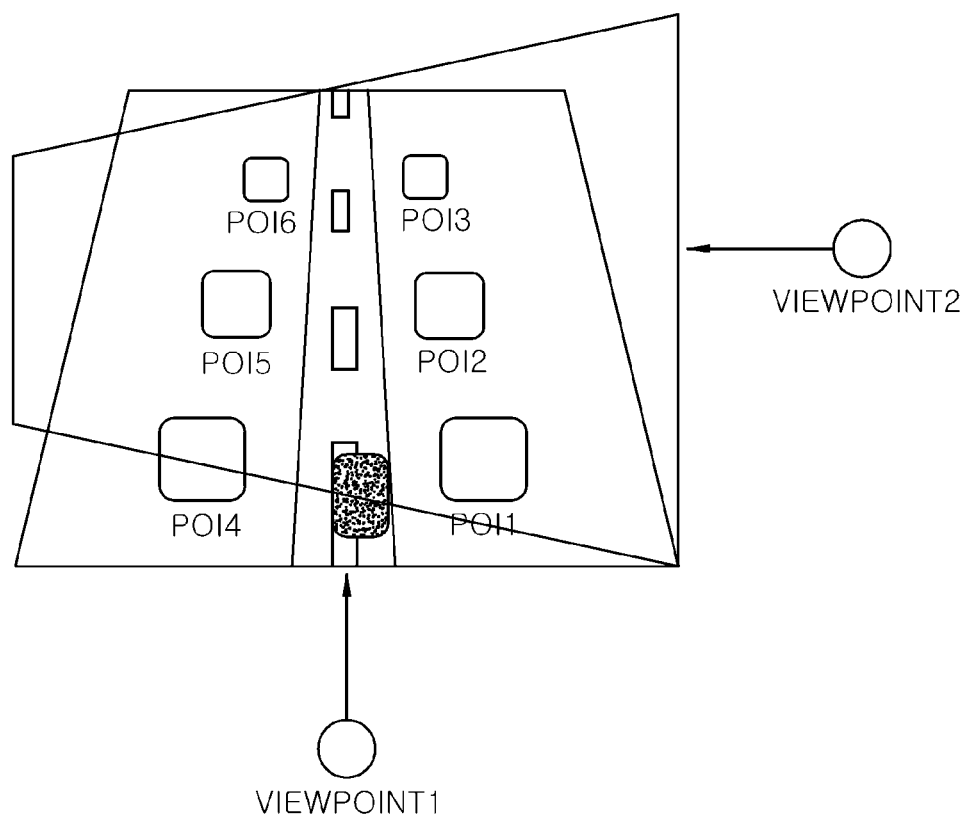
FIG. 2 illustrates that two viewpoints for displaying a vector map based on a map scale change in accordance with the embodiment of the present invention are applied to a map.

FIG. 1 illustrates two viewpoints for displaying a vector map in accordance with an embodiment of the present invention, and FIG. 2 illustrates that two viewpoints for displaying a vector map based on a map scale change in accordance with the embodiment of the present invention are applied to a map.

Referring to FIGS. 1 and 2, first and second viewpoints may be used for displaying a vector map in accordance with the embodiment of the present invention.

The first viewpoint may indicate a viewpoint facing the same direction as the driving direction of a vehicle.

More specifically, the vector map display system based on a map scale change in accordance with the embodiment of the present invention may display the first viewpoint of a vector map displayed on a user terminal device as a viewpoint moving to the left or right based on the center of the driving direction of the vehicle from the viewpoint facing the front of the screen, in response to the driving direction of the vehicle. That is, the first viewpoint may not be fixed, but flexibly varied depending on the turning direction of the vehicle.

The second viewpoint may indicate a viewpoint from the right side in the driving direction of the vehicle. The vector map may be divided into a right display region and a left display region based on the road on which the vehicle is driven. When displaying the second viewpoint, the vector map display system may adjust the stereoscopic effects and sizes of one or more of roads, buildings and POIs displayed in the right display region according to a user input signal inputted through the user terminal device 130, such that the one or more of the road, buildings and POIs displayed in the right display region have more clear visibility than roads, buildings and POIs displayed in the left display region.

More specifically, the vector map display system based on a map scale change in accordance with the embodiment of the present invention may display the second viewpoint of the vector map displayed on the user terminal device as a viewpoint moving to the left or right based on the center of the driving direction of the vehicle from the viewpoint from the right side in the driving direction of the vehicle, in response to the driving direction of the vehicle. That is, the second viewpoint may not be fixed, but flexibly varied depending on the turning direction of the vehicle.

Furthermore, the second viewpoint in accordance with the embodiment of the present invention does not indicate only the viewpoint from the right side in the driving direction of the vehicle, but can be changed to a viewpoint from the left side in the driving direction of the vehicle, depending on a user's settings or the driving road direction of the country where the vehicle is driven.

Moreover, the second viewpoint in accordance with the embodiment of the present invention may be separated at an arbitrary angle of 0 to 180 degrees to the left or right from the direction of the first viewpoint.

Furthermore, the second viewpoint in accordance with the embodiment of the present invention may be set to face downward from above at a predetermined angle, based on a horizontal plane.

In order to promote understandings of the vector map display system and method based on a map scale change in accordance with the embodiment of the present invention, the second viewpoint may be set to the viewpoint from the right side in the driving direction of the vehicle.

Web Vector Map Display System Based on Map Scale Change

Figure 3:
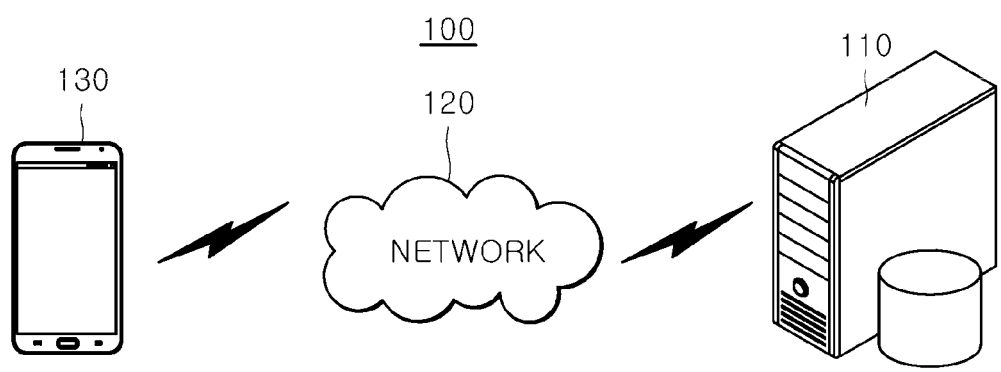
FIG. 3 illustrates a web vector map display system based on a map scale change in accordance with the embodiment of the present invention.
Figure 4:
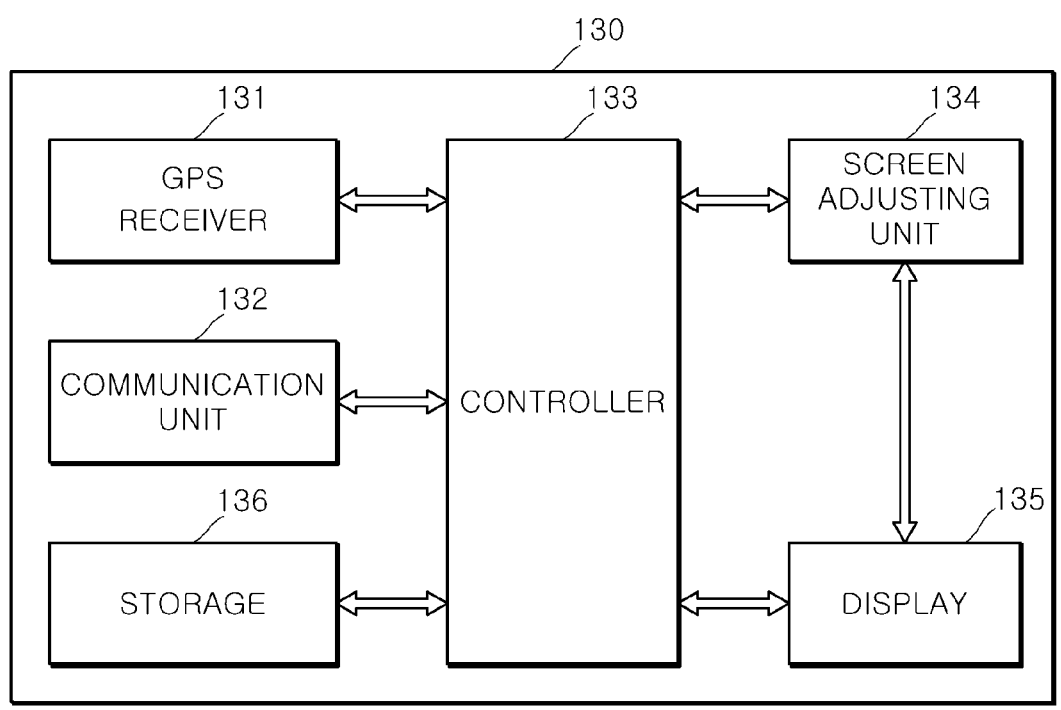
FIG. 4 is a configuration diagram of a user terminal device in accordance with the embodiment of the present invention.

FIG. 3 illustrates the web vector map display system based on a map scale change in accordance with the embodiment of the present invention, and FIG. 4 is a configuration diagram of a user terminal device in accordance with the embodiment of the present invention.

The web vector map display system 100 based on a map scale change in accordance with the embodiment of the present invention may include a server 110, a network 120 and a user terminal device 130.

The user terminal device 130 may include a GPS receiver 131, a communication unit 132, a controller 133, a screen adjusting unit 134, a display 135 and a storage 136.

The GPS receiver 131 may receive GPS satellite signals from three or more GPS satellites according to control of the controller 133, and generate current position information of the user terminal device 130.

The communication unit 132 may transmit and receive data to and from the server 110 through the network 120 according to control of the controller 133.

The storage 136 may store first viewpoint information indicating the direction of the first viewpoint and second viewpoint information indicating the direction of the second viewpoint in advance.

The storage 136 may store data of a web vector map in real time according to control of the controller 133, the data being received from the server 110 through the communication unit 132.

The controller 133 may control the operations of the GPS receiver 131, the communication unit 132, the screen adjusting unit 134 and the display 135.

In order to perform the web vector map display method based on a map scale change in accordance with the embodiment of the present invention, the controller 133 of the user terminal device 130 may transmit the current position information generated by the GPS receiver 131 and indicating the current position, destination information indicating the geographic position of a destination, and a service request signal to the server 110 through the communication unit 132, the service request signal requesting the server to transmit data of the web vector map corresponding to routes from the current position to the destination.

Then, the controller 133 of the user terminal device 130 may receive the data of the web vector map from the server 110 through the communication unit 132, and start the web vector map display method based on a map scale change.

Then, the controller 133 of the user terminal device 130 may perform a web vector map display viewpoint change step of changing the viewpoint of the web vector map received from the server 110, according to the directions of the first and second viewpoints stored in the storage 136.

The first viewpoint may indicate a viewpoint facing the front based on the driving direction of the vehicle, and include a viewpoint facing downward from above at a predetermined angle based on the driving direction of the vehicle. The second viewpoint may include a viewpoint from the right or left side in the driving direction of the vehicle.

Then, the controller 133 of the user terminal device 130 may perform a background or POI information extraction step of extracting a background or one or more pieces of POI information corresponding to the current position from the received data of the web vector map by reflecting the first and second viewpoints.

More specifically, the controller 133 of the user terminal device 130 may extract backgrounds or one or more pieces of POI information, which is to be currently displayed, from the web vector map depending on the front or rear distance of the vehicle based on the first viewpoint. Then, the controller 133 of the user terminal device 130 may calculate the sizes of the extracted backgrounds or one or more pieces of POI information.

Then, the controller 133 of the user terminal device 130 may perform a size ratio adjusting step of adjusting the ratio of the sizes of the extracted backgrounds or POI information based on the first and second viewpoints through the screen adjusting unit 134. The controller 133 of the user terminal device 30 may increase or decrease the ratio of the size of a background or one or more pieces of POI information located at the left or right side in the driving direction based on the second viewpoint, among the sizes of the extracted backgrounds or one or more pieces of information.

Furthermore, the controller 133 of the user terminal device 130 may adjust the ratio of the sizes of the extracted backgrounds or POI information according to a user's touch input signal received through the display 135 which can receive a touch input.

Figure 8A:
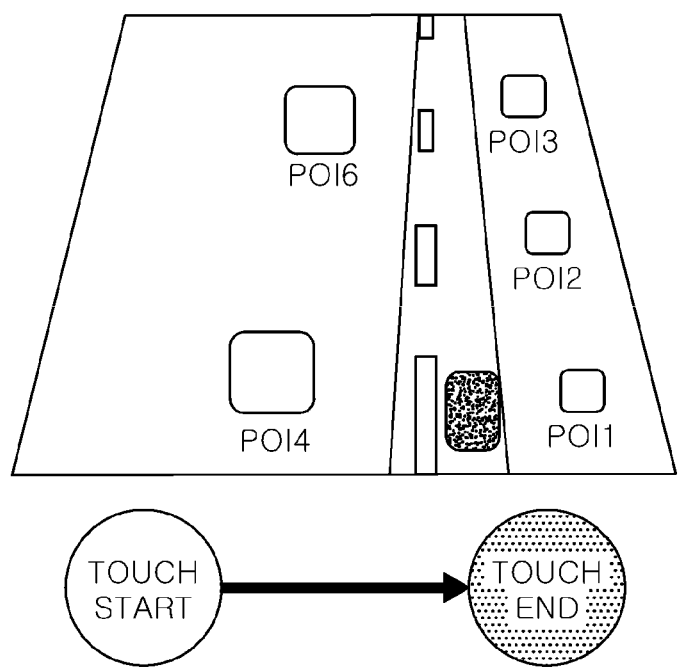
FIG. 8A and FIG. 8B illustrate that the size ratio of POIs is adjusted according to a user's touch input signal in order to display a web vector map based on a map scale change in accordance with the embodiment of the present invention.
Figure 8B:
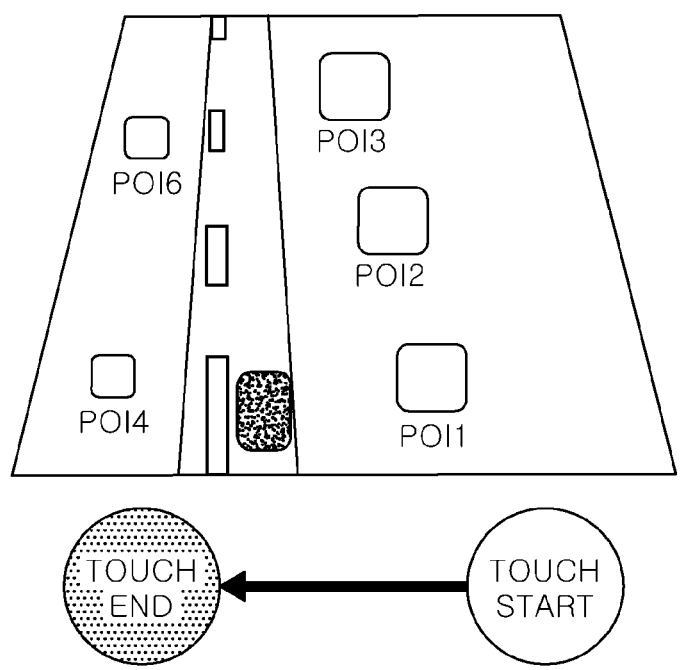

More specifically, FIGS. 8A and 8B illustrate that the size ratio of POIs is adjusted according to a user's touch input signal in order to display a web vector map based on a map scale change in accordance with the embodiment of the present invention.

Referring to FIG. 8A, when a user's touch input signal from left to right is received through the display 135, the controller 133 of the user terminal device 130 may change the second viewpoint to the viewpoint from the left side in the driving direction according to the received touch input signal. Then, the controller 133 of the user terminal device 130 may adjust the size ratio of the extracted background or POI information by reflecting the changed second viewpoint. That is, the controller 133 may increase the size ratio of the background or POI information to a predetermined ratio, the background or POI information being displayed in the left display region based on the driving direction.

Referring to FIG. 8B, when a user's touch input signal from right to left is received through the display 135, the controller 133 of the user terminal device 130 may change the second viewpoint to the viewpoint from the right side in the driving direction according to the received touch input signal. Then, the controller 133 of the user terminal device 130 may adjust the size ratio of the extracted background or POI information by reflecting the changed second viewpoint. That is, the controller 133 may increase the size ratio of the background or POI information to a predetermined ratio, the background or POI information being displayed in the right display region based on the driving direction.

Then, the controller 133 of the user terminal device 130 may perform a current web vector map data generation step of generating data of the current web vector map corresponding to the current position by reflecting the ratio-adjusted background or POI information into the received data of the web vector map.

Then, the controller 133 of the user terminal device 130 may display the generated data of the current web vector map through the display 135.

Web Vector Map Display Method Based on Map Scale Change

Figure 5:
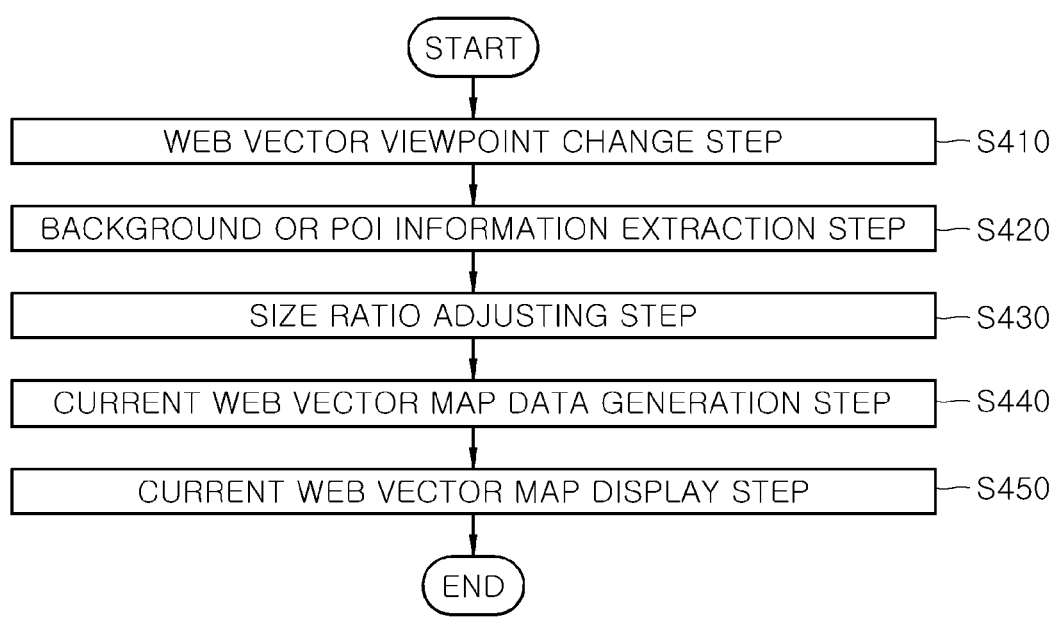
FIG. 5 illustrates a web vector map display method based on a map scale change in accordance with an embodiment of the present invention.

FIG. 5 illustrates a web vector map display method based on a map scale change in accordance with an embodiment of the present invention.

In the web vector map display method executed by the user terminal device, the controller 133 of the user terminal device 130 may perform a web vector map display viewpoint change step S410 of changing the viewpoint of a web vector map received from the server 110, according to the directions of the first and second viewpoints stored in the storage 136.

Then, the controller 133 of the user terminal device 130 may perform a background or POI information extraction step S420 of extracting a background or one or more pieces of POI information corresponding to the current position from the received data of the web vector map by reflecting the first and second viewpoints.

More specifically, the background or POI information extraction step may further include the following steps. The controller 133 of the user terminal device 130 may extract a background or one or more pieces of POI information, which is to be currently displayed, from the web vector map depending on the front or rear distance of the vehicle based on the first viewpoint. Then, the controller 133 of the user terminal device 130 may calculate the size of the extracted background or the one or more pieces of POI information.

Then, the controller 133 of the user terminal device 130 may perform a size ratio adjusting step of adjusting the size ratio of the extracted background or POI information based on the first and second viewpoints through the screen adjusting unit 134, at step S430.

Then, the controller 133 of the user terminal device 130 may perform a current web vector map data generation step S440 of generating data of the current web vector map corresponding to the current position by reflecting the ratio-adjusted background or POI information into the received data of the web vector map.

Then, the controller 133 of the user terminal device 130 may perform a current web vector map display step S450 of displaying the generated data of the current web vector map through the display 135.

Exemplary Embodiment of Web Vector Map Display Based on Map Scale Change

Figure 6:
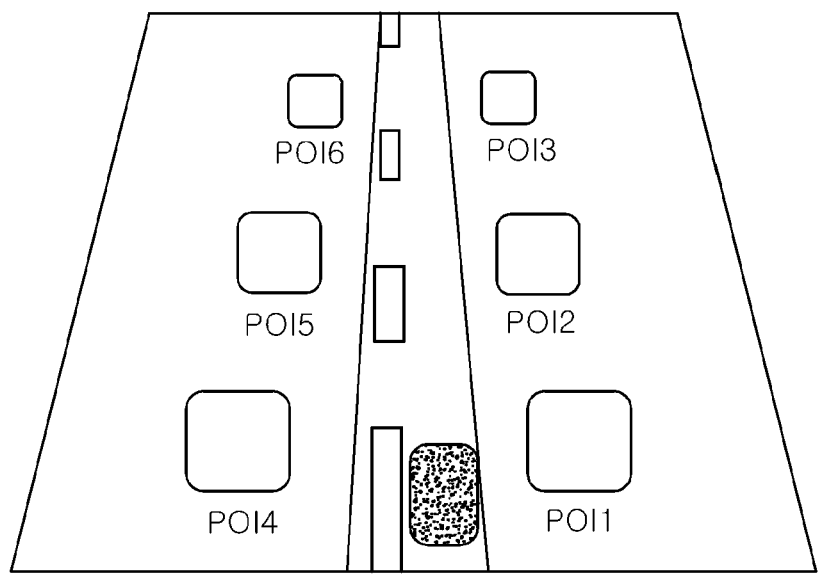
FIG. 6 illustrates that a map is displayed by the web vector map display method based on a map scale change in accordance with the embodiment of the present invention.
Figure 7A:
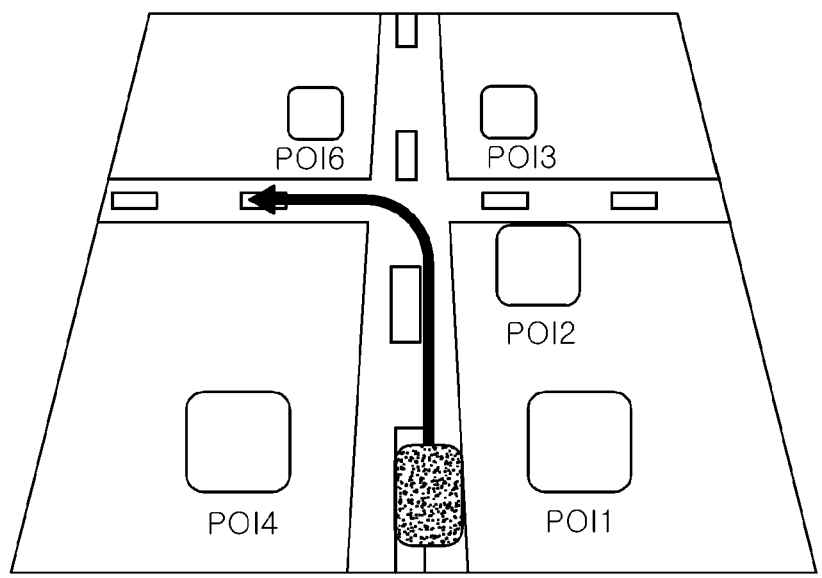
FIG. 7A-FIG. 7C illustrate that the size ratio of POIs included in a POI display region at the right side of a driving route is adjusted in order to display a web vector map based on a map scale change in accordance with the embodiment of the present invention.
Figure 7B:
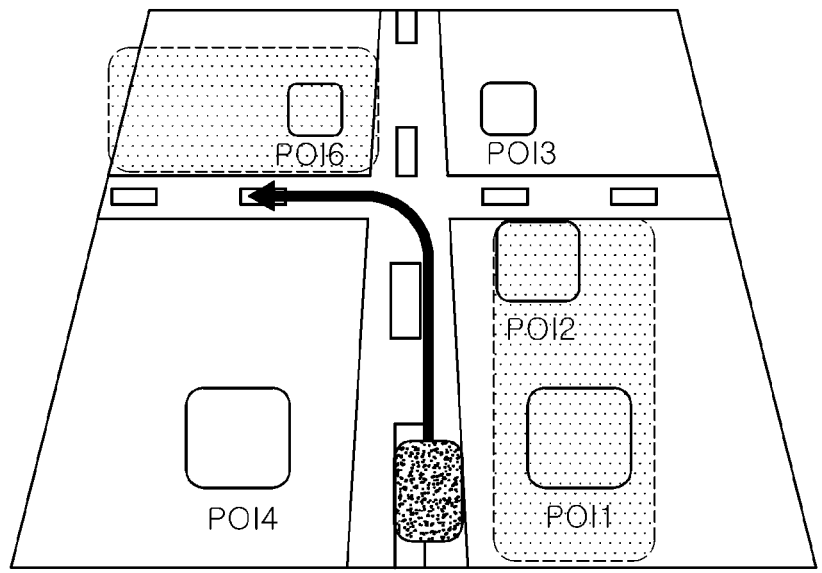
Figure 7C:
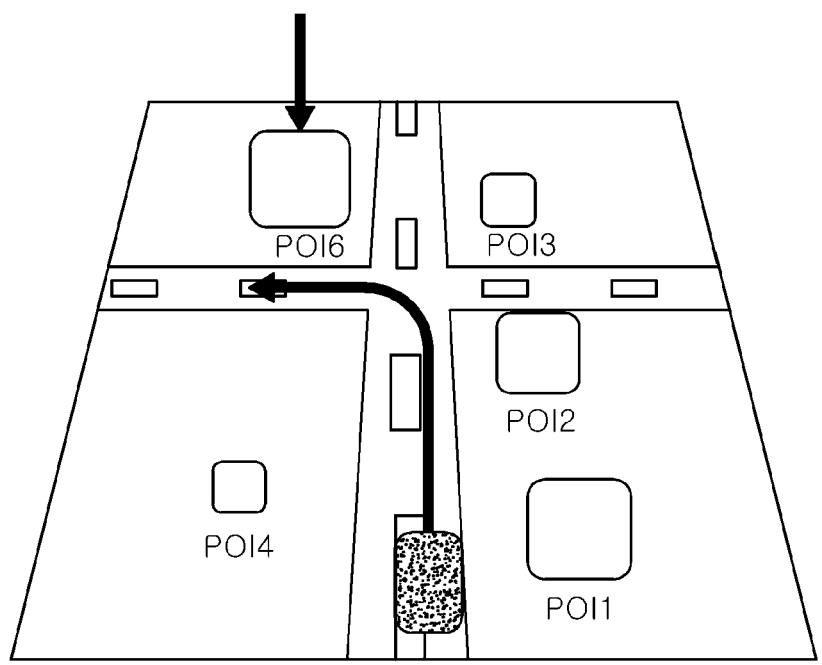

FIG. 6 illustrates that a map is displayed through the web vector map display method in accordance with the embodiment of the present invention, and FIGS. 7A to 7C illustrate that the size ratio of POIs included in a POI display region at the right side of a driving route is adjusted in order to display a web vector map based on a map scale change in accordance with the embodiment of the present invention.

Referring to FIG. 6, the web vector map in accordance with the embodiment of the present invention may be displayed while reflecting the first and second viewpoints. Since the size ratio of roads, buildings and POIs based on a driving direction is adjusted and displayed by reflecting the first and second viewpoints, a user's visibility can be secured.

The size ratio of images or fonts other than the web vector map included in the web vector map data in accordance with the embodiment of the present invention may also be adjusted by reflecting the first and second viewpoints.

Referring to FIGS. 7A to 7C, when route information for operation of the vehicle is stored in the user terminal device 130, the size of POIs displayed in the right display region of the web vector map displayed on the display 135 may be larger than the size of POIs displayed in the left display region, depending on the driving direction and turning direction of the vehicle.

The user terminal device 130 may adjust and display the size ratio of POIs 1, 2 and 6 positioned in the right display region on the stored route information. When the vehicle makes a turn during driving, the user terminal device 130 may adjust and display the size ratio of a POI 6 positioned at the right side based on the driving direction after the turn.

Vector Map Display System and Method Based on Map Scale Change

In some embodiments, data of a vector map may be prestored in a storage 136 of a user terminal device 130.

In that case, the controller 133 of the user terminal device 130 may perform a vector map display viewpoint change step of changing the viewpoint of the vector map stored in the storage 136, according to the directions of the first and second viewpoints stored in the storage 136.

Then, the controller 133 of the user terminal device 130 may perform a background or POI information extraction step of extracting a background or one or more pieces of POI information corresponding to the current position from the data of the vector map by reflecting the first and second viewpoints.

Then, the controller 133 of the user terminal device 130 may perform a size ratio adjusting step of adjusting the ratio of the sizes of the extracted backgrounds or POI information based on the first and second viewpoints.

Then, the controller 133 of the user terminal device 130 may perform a current vector map data generation step of generating data of the current vector map corresponding to the current position by reflecting the ratio-adjusted background or POI information into the data of the vector map.

Then, the controller 133 of the user terminal device 130 may display the generated data of the current vector map through the display 135.

These embodiments may be referred to as a local vector map display.

And a vector map display may be a term that includes a local vector map display and a web vector map display.

The terms used in the specification are generally intended as "open" terms in claims. For example, when an element is referred to as "comprising" a component, it may indicate that the element comprises the component, but is not limited to the component. Furthermore, when an element is referred to as "having" a component, it may indicate that the element has at least the component and can include other components. When a specific number is intended in claims, the intention is clearly described in the corresponding claims. When the descriptions are not present, it may indicate that such an intention is not present.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

What is claimed is:

1. A web vector map display method executed by a user terminal device, comprising:
    changing, by a controller, a viewpoint of a web vector map in directions of previously stored first and second viewpoints wherein the directions of the first and second viewpoints are different from each other;
    extracting, by the controller, a background or one or more pieces of POI information corresponding to a current position of the user terminal device from data of the web vector map based on the first and second viewpoints;
    adjusting, by the controller, a size ratio of width and height in the extracted background or POI information to a predetermined ratio in the first and second viewpoints;
    generating, by the controller, data of a current web vector map corresponding to the current position of the user terminal device based on the background or POI information in which the size ratio is adjusted, into the data of the web vector map; and
    displaying the data of the current web vector map.

2. The web vector map display method of claim 1, wherein the displaying the data of the current web vector map includes displaying the data of the current web vector map through a web page on a web to which the user terminal device is connected.

3. The web vector map display method of claim 1, wherein the first viewpoint is a viewpoint facing a front based on a driving direction of a vehicle in which the user terminal device is located, and comprises a viewpoint facing downward from above at a predetermined angle based on the driving direction of the vehicle.

4. The web vector map display method of claim 1, wherein the second viewpoint is a viewpoint in a direction perpendicular to a driving direction of a vehicle in which the user terminal device is located, and comprises a viewpoint separated at an angle of 180 degrees or less from the driving direction of the vehicle and facing downward from above at a predetermined angle.

5. The web vector map display method of claim 1, wherein the extracting a background or one or more pieces of POI information includes:

extracting a background or one or more pieces of POI information, which is to be currently displayed, from the data of the web vector map depending on a front or rear distance of a vehicle in which the user terminal is located, in the first viewpoint; and calculating a size of the extracted background or one or more pieces of POI information which is to be currently displayed.

6. The web vector map display method of claim 1, wherein the adjusting the size ratio of the extracted background or POI information includes adjusting the size ratio of POI information displayed in a display region in the second viewpoint to a larger size ratio than a size ratio of POI information displayed in another regions excluding the display region.

7. The web vector map display method of claim 1, wherein the adjusting the size ratio of the extracted background or POI information includes readjusting the size ratio of the extracted background or POI information according to a user's touch input signal received by the user terminal device.

8. A web vector map display system comprising a user terminal device, wherein the user terminal device comprises:

a storage configured to store data of a web vector map received from a server, first viewpoint information indicating a direction of a first viewpoint, and second viewpoint information indicating a direction of a second viewpoint in advance, wherein the directions of the first and second viewpoints are different from each other;

a display configured to display the web vector map; and a controller configured to change a viewpoint of the web vector map in the directions of the first and second viewpoints stored in the storage, extract a background or one or more pieces of POI information corresponding to a current position of the user terminal device from data of the web vector map based on the first and second viewpoints, adjust a size ratio of width and height in the extracted background or POI information to a predetermined ratio in the first and second viewpoints, generate data of a current web vector map corresponding to the current position of the user terminal device based on the background or POI information in which the size ratio is adjusted, into the data of the web vector map, and control the display to display the generated data.

9. The web vector map display system of claim 8, wherein the data of the current web vector map are displayed through a web page on a web to which the user terminal device is connected.

10. The web vector map display system of claim 8, wherein the first viewpoint is a viewpoint facing a front based on a driving direction of a vehicle in which the user terminal device is located, and comprises a viewpoint facing downward from above at a predetermined angle based on the driving direction of the vehicle.

11. The web vector map display system of claim 8, wherein the second viewpoint is a viewpoint in a direction perpendicular to a driving direction of a vehicle in which the user terminal device is located, and comprises a viewpoint separated at an angle of 180 degrees or less based on the driving direction of the vehicle and facing downward from above at a predetermined angle.

12. The web vector map display system of claim 8, wherein the controller extracts a background or one or more pieces of POI information, which is to be currently displayed, from the data of the web vector map depending on a front or rear distance of the vehicle in which the user terminal device is located, in the first viewpoint, and calculates a size of the extracted background or one or more pieces of POI information which is to be currently displayed.

13. The web vector map display system of claim 8, wherein the controller adjusts the size ratio of POI information displayed in a display region in the second viewpoint to a larger size ratio than a size ratio of POI information displayed in another regions excluding the display region.

14. The web vector map display system of claim 8, wherein the controller readjusts the size ratio of the extracted background or POI information according to a user's touch input signal received through the display.

15. A vector map display method executed by a user terminal device, comprising:

changing, by a controller, a viewpoint of a vector map in directions of previously stored first and second viewpoints wherein the directions of the first and second viewpoints are different from each other;

extracting, by the controller, a background or one or more pieces of POI information corresponding to a current position of the user terminal device from data of the vector map based on the first and second viewpoints;

adjusting, by the controller, a size ratio of width and height in the extracted background or POI information to a predetermined ratio in the first and second viewpoints;

generating, by the controller, data of a current vector map corresponding to the current position of the user terminal device based on the background or POI information in which the size ratio is adjusted, into the data of the vector map; and displaying, by the controller, the data of the current vector map.

16. The vector map display method of claim 15, wherein the first viewpoint is a viewpoint facing a front based on a driving direction of a vehicle in which the user terminal device is located, and comprises a viewpoint facing downward from above at a predetermined angle based on the driving direction of the vehicle.

17. The vector map display method of claim 15, wherein the second viewpoint is a viewpoint in a direction perpendicular to a driving direction of a vehicle in which the user terminal device is located, and comprises a viewpoint separated at an angle of 180 degrees or less based on the driving direction of the vehicle and facing downward from above at a predetermined angle.

18. The vector map display method of claim 15, wherein the extracting a background or one or more pieces of POI information includes:

extracting a background or one or more pieces of POI information, which is to be currently displayed, from the data of the vector map depending on a front or rear distance of the vehicle in which the user terminal is located, in the first viewpoint; and calculating a size of the extracted background or one or more pieces of POI information which is to be currently displayed.

19. The vector map display method of claim 15, wherein the adjusting the size ratio of the extracted background or POI information includes adjusting the size ratio of POI information displayed in a display region in the second viewpoint to a larger size ratio than a size ratio of POI information displayed in another regions excluding the display region.

20. The vector map display method of claim 15, wherein the adjusting the size ratio of the extracted background or POI information includes readjusting the size ratio of the extracted background or POI information according to a user's touch input signal received by the user terminal device.

* * * * *